Jan. 28, 1958     J. B. WALKER     2,821,105
SYSTEM FOR OPTICALLY COMBINING PLURAL IMAGES
Filed April 1, 1954
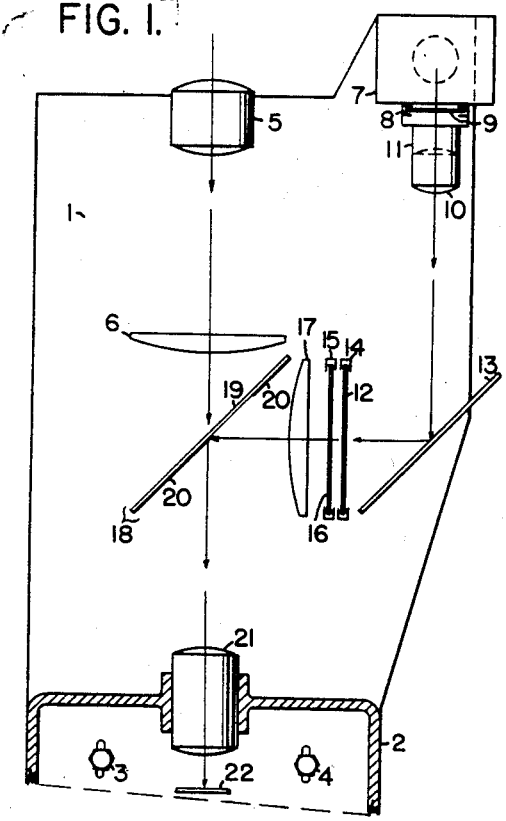
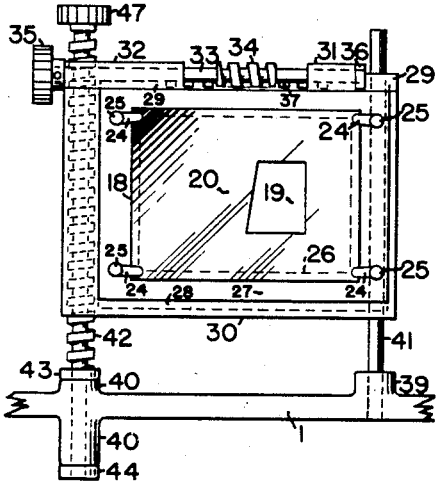
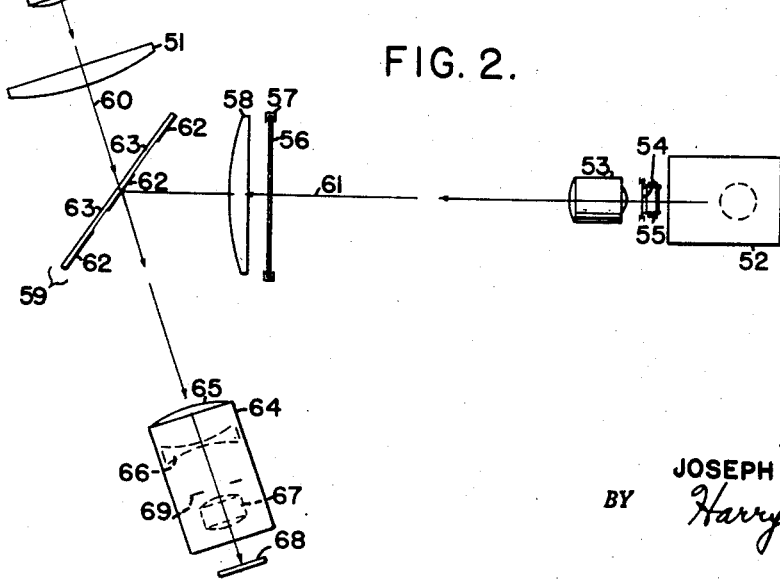
INVENTOR.
JOSEPH B. WALKER
BY Harry R. Lubcke
AGENT

United States Patent Office 2,821,105
Patented Jan. 28, 1958

2,821,105

SYSTEM FOR OPTICALLY COMBINING PLURAL IMAGES

Joseph B. Walker, Los Angeles, Calif.

Application April 1, 1954, Serial No. 420,402

8 Claims. (Cl. 88—16)

My invention relates to means for optically superimposing images in such arts as television, motion pictures and photography.

In these arts convenience in manipulation is important. My device is relatively small and may be attached directly to a camera. It is of the mutually exclusive type; the intensity at any point in the combined image is the intensity of one or the other of the superimposed images, but not of both.

The need of the art for a precision device of this type is evidenced by the rather crude superimpositions often shown by merely combining the electrical outputs of two television cameras. This results in an unnatural ghost-like effect in which persons and objects assume a transparent quality. While this may be acceptable in certain instances, a device which promotes realism by eliminating this effect is highly desirable.

This I accomplish by employing a mirror having full reflection over the area to be occupied by one image and no reflection over the area to be occupied by the other image. This discriminatory surface is located close to the focal planes of the optical systems involved in order that the lines of demarcation shall be necessarily sharp. In certain embodiments I employ optical paths at obtuse angles to enhance the capability of the apparatus in this respect.

An object of my invention is to optically superimpose plural images according to a division of the area of the resulting image; only one image occupying any given element of area.

Another object is to superimpose images without a resulting transparent or ghost-like effect in the combined image.

Another object is to provide a superimposition device which is relatively small and may be attached directly to a camera.

Another object is to provide a superimposition device which may be used to superimpose images from a live action scene and a slide, a motion picture film, an illuminated print or another live action scene, or any combination of these.

Another object is to allow superimposition of images from conventional sized slides with images of live performers, said slides representing a convenient and available form of "stock shots."

Another object is to provide a superimposition device fabricated of optical elements of convenient size, nominal weight and ordinary expense.

Other objects of my invention will become apparent upon reading the following detailed specification and upon examining the related drawings, in which:

Fig. 1 shows a plan view of my system,
Fig. 2 shows an alternate system in plan,
Fig. 3 shows details of the reflective matte in elevation, and
Fig. 4 shows a plan view of the reflective matte structure.

Figs. 1 and 2 are simplified in part, in that conventional supporting means and other details obvious to those skilled in the art have been omitted in the interests of clarity.

In Fig. 1 numeral 1 indicates a base plate upon which the major elements of my system are mounted. This is attached to the television, motion picture, or photographic camera, or the like, 2, by means of bolts 3 and 4 fastening through elongated slots for general focal adjustment. Lens 5 is of the converging or positive type and of photographic quality of usual focal length. An image of the field of view is formed by this lens somewhat beyond field lens 6, which has a longer focal length than lens 5. This positive field lens is employed to increase the covering power of this portion of the system, i. e., to prevent unwanted decrease of illumination at the edges of the image.

I have found it convenient to formulate the second portion of the optical system for flexibility of operation in order to obtain a wide range of images for combining with that of the field of view. As shown in Fig. 1, 7 identifies the lamp house of a slide projector. Numeral 8 identifies the slide holder, 9 the slide, 10 the positive objective lens and 11 the lens tube, the latter utilized to adjust the position of lens 10 to focus an image on ground glass screen 12. Preferably first surface mirror 13 in plan in Fig. 1 is employed to give a change in direction to the second optical axis for mechanical compactness of the system.

Screen 12 is held in holder 14, from which it can be easily removed for other formulation of the second optical system. A second holder 15 is provided in which for the present a mask 16 is inserted. The mask may be an opaque cut-out for the purpose of restricting the extent of the image from slide 9, or it may be semi-opaque as obtained with an air brush for reducing the intensity of or for eliminating certain portions of the image of the slide. It is to be understood that slide 9 may be from an available stock slide library or may have been shot without the particular needs of the present use known. As such, were it the scene of a house, it might also include a garage and a garage is not to be shown in the present instance. Lens 17 is likewise a field lens having approximately the same focal length as lens 6 and of the positive light-converging type.

Element 18 is the reflective matte. This is a mirror over most of the area in the example illustrated, as will be noted in both Figs. 1 and 3. Area 19 is clear and area 20 is silvered. From the optics previously described it is evident that the image appearing upon ground glass 12 will be reflected by all of area 20 but not by area 19. The first surface of the mirror may be provided with an anti-reflection coating if great precision in image separation is required. Similarly, that portion of the image of the field of view formed by lens 5 which is in line with clear area 19 will be transmitted through the matte but all other portions will be blocked-off by the opaque mirror coating 20. It is important to note that reflective matte 18 is not one of the well-known "half-silvered" mirrors, but that according to the area considered it is either fully reflecting or not reflecting at all. The half-silvered mirror, of course, reflects half of the illumination falling upon any area thereof and transmits the other half.

The field of view of positive camera lens 21 thus includes the combined image from both portions of the optical system. This lens is slidably mounted in camera case 2 and the composite working image of the system is formed in focus upon surface 22. This is usually the sensitive surface of a television pickup tube, a frame of a strip of unexposed motion picture film, an unexposed photographic plate or film, an equivalent transducing surface, a ground glass screen, the plane of the scanning member if mechanical television-like scanning is employed, or the like.

The two initial images are approximately in focus at reflective matte 18. This insures that the junction between the two image areas will be properly defined. If the images were considerably out of focus the margins would be diffuse and realism would be lost. If the images were sharply in focus slight inaccuracies in forming the clear area 19 would be seen and realism would likewise be lost. Practical usefulness thus dictates the conditions realized by my system.

In use, a particular matte is selected for the required scene. In the one shown in elevation in Fig. 3, the reflective surface 20 reflects the image of a house, say, approximately focused thereon by suitable adjustment of lens 10 of the second optical system, while the transmissive area 19 allows the image of a life-size actor to walk toward the observer at the side of the house approximately focused at that plane by suitable adjustment of lens 5 of the first optical system. In the life-size set only a little greenery is required to give the overall impression of a unified scene.

A plurality of spring clips 24 are provided with knobs 25 for retaining the reflective matte 18 against a recessed lip 26 in matte carrier 27. Clips 24 are rotated away from the matte for changing and returned to place as shown for retaining the same. In this way it is possible to change mattes in a few seconds as may be necessary between scenes in a television show or other performance. During rehearsal the desired slides are selected, the position of camera 2 with respect to the performer or other object of principal interest determined and a reflective matte prepared. Preparation merely requires removing an area of the mirror coating from stock mirror material previously cut to matte size. Aluminized, silvered or platinized mirrors are preferred, with the reflective surface facing lens 21. The coating is removed from the area to be clear by a sharp razor blade or scalpel, or chemically by means of acid or another reagent applied by means of an inert-bristled brush or other applicator. A combination of these means may be used, for instance, the mechanical means for determining the precise margins and the chemical means for removing the major portion of the unwanted area. In addition to preparing a matte for a particular scene mattes having usually required areas of transmissibility may be prepared as a stock library. Similarly, those prepared for previous scenes may be retained, indexed in a slide file, so that numerous image combinations may be effected without individual matte preparation, or with only minor modification.

It is convenient, if not necessary, that means be provided to accurately position the reflective matte with respect to the two images formed adjacent to it. Such means is shown in Figs. 3 and 4. The matte carrier 27 is translatable horizontally in grooves 28 and 29 formed in plate 30. The plate also carries two bearing portions 31 and 32 in which a shaft 33 revolves. The shaft is fitted with a worm 34, knob 35 and collar 36. The top edge of carrier 27 is cut with a worm gear toothed rack 37, which engages the worm. This structure allows precise horizontal positioning of the matte.

At the required location of mirror matte 18 shown in Fig. 1, base 1 is provided with bosses 39 and 40 as shown in Fig. 3. Rod 41 is rigidly mounted in boss 39. Worm 42 is rotatably mounted in boss 40, with collars 43 and 44 affixed in close fits. Boss 40 may be extended any reasonable distance downward to attain appropriate directional stability of the worm. Plate 30 is provided with a journal portion 45 in which rod 41 is a close sliding fit, and an opposite portion 46 provided with internal worm threads for receiving worm 42. See Fig. 4. The worm is fitted with a knob 47, the turning of which accomplishes vertical positioning of the matte. By operating both knobs 35 and 47 it is possible to position the matte over any reasonable portion of the two images impressed upon it. In other words, although the matte is prepared to give the combination of images sought, accurate adjustment in the position of the matte is required to accomplish the purpose.

Fig. 2 shows an important variation of my system of Fig. 1. It will be noted that in Fig. 2 the optical axes of the image paths combined by the reflective matte are not at ninety degrees, but at an obtuse angle, considering the incoming paths thereto. This has the advantage of placing the matte and the planes of the two images in more nearly a parallel relationship and thus more uniformly in focus over the plane of the matte. The angle may be more obtuse than that shown, the criterion being that the edge rays from the reflective matte do not impinge upon the adjacent field lens.

Describing the structure of Fig. 2 in detail, lens 50 is the equivalent of lens 5 in Fig. 1 and lens 51 is the equivalent of lens 6. A lamphouse is 52 and a projector lens 53. In Fig. 2, however, a motion picture film is shown at 54 and a suitable film transport mechanism at 55, so that motion pictures appear on translucent screen 56 in holder 57. A field lens 58 is the equivalent of lens 17 as before. Matte 59 is positioned to bisect the angle formed by the axes 60 and 61 of the incoming optical systems. To further illustrate the principles involved matte 59 has three reflective areas 62 and two transparent areas 63 in this embodiment.

The combined image rays continue along axis 60 prolonged and enter lens assembly 64. This is one of the Electrazoom type, described in my United States Patents 2,506,947; 2,515,104; 2,547,187 and 2,532,685. In this embodiment it is therefore possible to zoom the combined image. That is, the resultant scene may be taken at various magnifications of the image as though the camera were moved toward or away from the scene. The Electrazoom lens is often constructed with a relatively long focal length positive lens element 65, a somewhat shorter focal length negative element 66 and a short focal length positive element 67. Elements 66 and 67 move toward each other to obtain greater magnification, this being under the control of the operator. The working surface is 68, positioned as before.

All the lenses in my system have a positive or converging overall effect although some lens elements may have negative or diverging characteristics for purposes of optical correction or for zoom effects.

In these ways I accomplish several objects of my invention.

This equipment is versatile and several alternate arrangements are possible by merely altering the elements shown. This can be accomplished without reconstruction by the operator.

In Fig. 1 slide 9 may be omitted and the same scene on preferably a larger slide inserted in the place of ground glass screen 12, i. e., in holder 14. Lamphouse 7 and lens 10 then constitute a light source.

It should be mentioned that the size of the reflective matte and therefore of the system as a whole is determined in practice by the size necessary for accurate preparation of the boundaries between clear and reflective areas. Without restricting this invention it is stated that this is often the 3¼" by 4¼" slide size. In such an embodiment the well known "two by two" (inch) slides are best exhibited in holder 8, Fig. 1, associated with the lamphouse. Conversely, if 3¼" by 4¼" slides are at hand, these are conveniently exhibited in holders 14 or 15. It will be understood that the art may utilize very large or very small slides, with correspondingly sized reflective mattes and field lenses without departing from my invention. As an example, semi-microscopic techniques may be employed to work small mattes.

In a similar alternate arrangement lamp house 7 may be removed, slide 9 omitted and a second field of view of living actors, or the like, employed as the second image. This allows ferocious animals to be optically brought into the scene although caged with respect to an actor who performs in the original field of view. Furthermore, posters, prints, photographs, sponsor's products and other opaque objects may be optically combined with the field of view on a mutually exclusive basis with this arrangement. It is merely necessary that these items be suitably illuminated in the well known manner and that lens 10 or an equivalent provide an image at or near the plane of the reflective matte.

In Fig. 2, a slide may be employed in the place of motion picture film 54, or all imagery there omitted and a slide placed in holder 57. By utilizing lens 53 alone of the group of elements 52 to 55 the several combinations recited above as to a second field of view can be accomplished, with this field of view farther removed from the first field. Various magnifications of the second image may be obtained by utilizing other lenses than 53 at positions along optical axis 61. Similarly, zoom lenses may be employed for lenses 53, 50 and/or 21. By suitably moving the slides or other visual media the effect of the observer being in motion can be simulated.

In Fig. 1 more than one image may be supplied by the second optical system by placing a slide 8 in holder 9 and also another slide 12 in holder 14. The resulting image at mirror surface 20 is the subtractive combination of the two with respect to the original intensity of the light source over the area.

The optical parameters of my system are essentially relative. Without restricting the invention it may be said that medium or somewhat long focal length lenses are to be preferred to those known as wide angle or short focal length lenses. Images formed by the longer focal length lenses do not defocus as rapidly with a given increment of distance from the focal plane as do those of the short focal length type. For example, lens 5 may have a focal length of from five to ten inches for usual work, lens 6 about fifty percent longer than that of lens 5, lens 17 about the same as that of lens 6, and lenses 21 or 64 a focal length of from four to nine inches.

The speed or aperture of the lenses depends upon the illumination of the scenes and the sensitivity of the working device. It may vary from f2.5 to f16 according to circumstances of both construction and use. At least one adjustable diaphragm is desirable in the system, as iris 69 in lens 64, Fig. 2.

The above example is intended as a guide in usual television, motion picture or photographic practice. For microphotography the values would all be smaller, as to lengths; for photostat practice larger, and so on.

It will be appreciated by those in the art that my system is relatively efficient, effective in realism, small in size, light in weight and of low cost. Ghost effects are eliminated.

As taught above, modifications may be made in the size, proportions, shape and arrangements of the parts in my system without departing from the spirit of my invention.

Having thus fully described my invention and the manner in which it is to be practiced, I claim:

1. A system for optically combining plural images comprising a positive lens for forming an image of an object, a field lens of greater focal length than said first lens coaxially mounted with respect thereto closer than the focal plane thereof, means for forming a second image of a second object, a second field lens mounted between said means and said second image close to said second image, a mirror equally oblique to each of said field lenses lying across the optical axis of each and close to said image of each, said mirror having a reflective area and a transparent area, laterally adjustable means for removably holding said mirror, a second positive lens positioned opposite to one said field lens with respect to said mirror, the field of view of said second positive lens consisting of that portion of one said image as transmitted through the transparent area of said mirror and that portion of said second image as reflected by the reflective area of said mirror, and a working surface on the side opposite said mirror with respect to said second positive lens for receiving the image of said field of view of that lens.

2. A system for optically combining mutually exclusive areas of two images comprising a lens for forming a real image, a field lens coaxial therewith, a second lens for forming a second real image, a second field lens coaxial therewith, the coaxial axes of said second lenses at an obtuse angle to the coaxial axes of said first lenses, a mirror oriented to bisect the angle formed by said axes, said mirror located at substantially the planes of said real images, said mirror having at least one reflective area and at least one clear area within the areas occupied by both of said real images, means to translate said mirror within substantially said planes of said real images for adjusting the positions of said reflecting and said clear areas with respect to said images, a third lens for forming a real image of the composite image at said mirror, said image consisting of that area of said real image formed by said first lens passed through said clear area of said mirror and of that area of said real image formed by said second lens reflected from said reflective area, and a transducing surface beyond said third lens for receiving said real image formed thereby.

3. A system for optically combining mutually exclusive areas of two images comprising a positive photographic lens for forming an image of a field of view, a positive field lens having a focal length greater than said photographic lens coaxially mounted with respect thereto at a distance closer than that of the focal plane thereof, a second positive lens for forming a second image of a different field of view, a second positive field lens having a focal length greater than said second positive lens and mounted with respect thereto at a distance closer than the focal plane thereof, a plane mirror positioned equally oblique to each of said field lenses and lying across the optical axis of each and close to said focal planes, said mirror having at least one fully reflective area and at least one essentially non-reflective area, a rigid frame for supporting said mirror, means upon said frame for removably holding said mirror, first mechanical means for altering the position of said frame in the plane of said mirror, a plate supporting said frame, second mechanical means attached to said plate for laterally altering the position of said plate in a second direction in the plane of said mirror, a third positive lens mounted coaxially with respect to said first positive lens on the side opposite said mirror from said first lens, a working surface for receiving the image of said third lens, said surface located on the opposite side of said third lens from said mirror a distance along said axis such that an image of the images reflected by the reflective area of said mirror and transmitted through the non-reflective area thereof is formed upon said surface.

4. In a system for optically combining mutually exclusive areas of two real images a reflective matte and image-forming assembly comprising, a plane mirror, said mirror having at least one reflective area and at least one transmissive area with a regularly defined boundary therebetween, means to form a real inverted image behind and closely adjacent to said mirror, other means to form another real inverted image in front and closely adjacent to said mirror, said two means each including a field lens and angularly related at an obtuse angle one to the other to form a composite image consisting of that portion of said image formed behind said mirror which passes through said transmissive area and that portion of said image formed in front of said mirror which is reflected by said reflective area, said composite image being composed of light leaving said mirror in a common path, a carrier, said reflective matte being removably mounted in said carrier to allow substitution of other mattes, a plate in substantially the plane of said mirror, said carrier being mounted upon said plate, a worm mounted on said plate, a rack upon said carrier engaging the same, an assembly base, a second worm mounted upon said base at right angles to said first worm and worm threads within said plate engaging said second worm, said carrier and plate mechanisms constituting a compact arrangement for allowing adjustment of the position of said mirror in two directions in the plane thereof.

5. A system for optically combining mutually exclusive areas of two images comprising a converging lens of photographic quality for forming an image of a life-size field of view, a converging field lens having a focal length greater than said first lens coaxially mounted with respect thereto at a distance less than the distance to the focal plane of said first lens, an approximately collimated source of light, an auxiliary mirror for altering the path thereof to the vicinity of said field lens at a direction perpendicular to the axis of said prior lenses, an image-bearing slide in said path adjacent said field lens, a mask adjacent said slide and parallel planar therewith, a second converging field lens coaxially related to said path and on the side of said mask opposite to said slide, a plane mirror equally oblique to each said field lenses and lying across the optical axis of each, said plane mirror having at least one reflective area and at least one transparent area within the areas occupied by both of said prior images, a rigid frame for supporting said plane mirror, means upon said frame for removably holding said plane mirror, mechanical means for altering the position of said frame in the plane of said mirror, a plate supporting said frame, second mechanical means attached to said plate for altering the position of said plate in a second direction also in the plane of said mirror, a second converging lens of photographic quality mounted coaxially with respect to said first lens on the opposite side of said plane mirror from said first photographic lens, a planar working surface for receiving the image of said second photographic lens located opposite said plane mirror on the axis of said lens, the described structure causing a composite image consisting of that area of said first image which is transmitted through said plane mirror and that area of said second image which is reflected by said plane mirror to be formed upon said surface by said second photographic lens.

6. A system including a reflective matte for optically combining mutually exclusive areas of two images comprising a positive lens for forming a real image, a positive field lens coaxial therewith near the focal plane of said first lens, a second positive lens for forming a second real image, a second positive field lens coaxial therewith near the focal plane of said second lens, the axis of said second lenses at an obtuse angle to the axis of said first lenses measured between the actual light paths, a mirror constituting a reflective matte oriented to bisect the angle formed by said axes, said mirror located at substantially the planes of said real images, said mirror having at least one reflective area and at least one clear area within the common area of said real images, mechanical means to translate said mirror transversely over said common image area in two dimensions for adjusting the positions of said reflecting and said clear areas with respect to said common image area, a third positive lens for forming a real image of the composite image at said mirror, said image consisting of that area of said real image formed by said first lens passed through said clear area of said mirror and of that area of said real image formed by said second lens reflected from said reflective area, and a plane surface beyond said third lens adjustable as to distance therefrom for receiving said real image formed thereby.

7. A system for optically combining mutually exclusive areas of two images comprising a positive lens for forming a real image, a positive field lens coaxial therewith near the focal plane of said first lens, means for illuminating and transporting motion picture film, a second positive lens for forming a second real image from said film, a second positive field lens coaxial therewith near the focal plane of said second lens, the axis of said second lenses at an obtuse angle to the axis of said first lenses measured between the actual light paths, a mirror oriented to bisect the angle formed by said axes, said mirror located in front of said first real image and behind said second real image, said mirror having at least one reflective area and at least one clear area within the area common to said real images, mechanical worm means to translate said mirror transversely over said common image area in two dimensions for adjusting the positions of said reflecting and said clear areas with respect to said common image area, a third positive lens of adjustable magnification for forming a real image of the composite image at said mirror, said image consisting of that area of said real image formed by said first lens which is passed through said clear area of said mirror and of that area of said real image formed by said second lens which is reflected by said reflective area, and a plane image-receiving surface beyond said third lens adjustable as to distance therefrom for receiving said real image formed by said third lens.

8. A system for optically combining images comprising a converging lens for forming an image of a field of view, a second converging lens of greater focal length than said first lens coaxially mounted with respect thereto at approximately the focal plane thereof, a slide having an image reproduced thereon in terms of opacity, means to illuminate said slide, a third converging lens with axis perpendicular to the surface of said slide, said third lens positioned on the opposite side of said slide and in relation to said second lens to form an image of said slide in the vicinity of said focal plane of said first lens, the optical paths defined by said second and third lenses lying at an obtuse angle, a mirror equally oblique to each of said second and third lenses and upon the optical axis of each positioned at approximately the intersection of said axes and at approximately said focal plane of said first lens, said mirror having a reflective portion and a transparent portion, a variable focal length lens positioned beyond said mirror in line with the optical axis of said first lens, illumination from said field of view thereby passing through said transparent portion of said mirror and to said variable focal length lens and illumination from said slide image reflected by said reflective portion passing to said variable focal length lens, and a surface beyond said variable focal length lens to receive the composite image formed by said variable focal length lens from both said illuminations.

References Cited in the file of this patent

UNITED STATES PATENTS

| | | |
|---|---|---|
| 1,477,999 | Douglass | Dec. 18, 1923 |
| 1,601,886 | Schufftan | Oct. 5, 1926 |
| 1,606,483 | Schufftan | Mar. 13, 1930 |
| 2,229,678 | Seaman | Jan. 28, 1941 |
| 2,257,676 | Gance at al. | Sept. 30, 1941 |
| 2,488,177 | Dufour | Nov. 15, 1949 |

FOREIGN PATENTS

| | | |
|---|---|---|
| 309,137 | Great Britain | Mar. 13, 1930 |
| 523,019 | Germany | Apr. 18, 1931 |